US006784567B1

(12) United States Patent
Klitzner

(10) Patent No.: US 6,784,567 B1
(45) Date of Patent: Aug. 31, 2004

(54) ELECTRICAL SWITCHING APPARATUS AND METHOD

(76) Inventor: Orrin Edward Klitzner, 29 Lee Hill Rd., Andover, NJ (US) 07821

( * ) Notice: Subject to any disclaimer, the term of this patent is extended or adjusted under 35 U.S.C. 154(b) by 203 days.

(21) Appl. No.: 10/162,925

(22) Filed: Jun. 6, 2002

(51) Int. Cl.[7] ............................ B60L 1/00; H01R 13/68

(52) U.S. Cl. ........................................ 307/9.1; 439/621

(58) Field of Search ................................ 307/9.1, 10.1; 439/621, 622, 626, 638, 656; 337/186, 188, 190, 227, 231

(56) References Cited

U.S. PATENT DOCUMENTS 4,555,638 A * 11/1985 Lobe ......................... 307/10.1
4,825,345 A 4/1989 Stevens
4,884,050 A 11/1989 Kozel
5,125,855 A 6/1992 Brooks
5,324,214 A 6/1994 De Castro
5,431,585 A 7/1995 Fan
5,444,428 A 8/1995 Carr et al.
5,476,396 A 12/1995 De Castro
5,877,563 A * 3/1999 Krappel et al. ............ 307/10.1
5,949,148 A * 9/1999 Wagner ..................... 307/10.1
6,247,936 B1 * 6/2001 Bullard ........................ 439/49

FOREIGN PATENT DOCUMENTS

JP 11-260237 9/1999

* cited by examiner

*Primary Examiner*—Matthew V. Nguyen
(74) *Attorney, Agent, or Firm*—Stephen Christopher Swift; Swift Law Office

(57) ABSTRACT

A switching apparatus and method designed to control a car radio or other device with only one connection to the vehicle and with no modification to the original wiring. (However, the scope of the invention is not limited to vehicles.) In the first preferred embodiment it is used to power a cell phone or other device from the line to the car radio. In both preferred embodiments, the power to the radio is cut off when the cell phone is in use. The fuse in the fuse box for the car radio is replaced with a dummy fuse. That fuse is then inserted into an in-line fuse holder. A connector on each leg of the output from the dummy fuse can supply power to the cell phone. A third connector may be plugged into one of the other connectors for powering of hand-free cellular phones that may be independently fused.

20 Claims, 2 Drawing Sheets

ELECTRICAL SWITCHING APPARATUS AND METHOD

BACKGROUND OF THE INVENTION

1. Field of the Invention

The present invention relates to electrical switching devices designed for use in automobiles or other vehicles.

2. Description of the Prior Art

There have been numerous previous inventions for electrical switching devices designed for use in vehicles, but there are none in the prior art that are equivalent to the present invention, which is a switching device that can control a vehicle's radio, without cutting into the wiring of the vehicle or the device.

U.S. Pat. No. 4,825,345, issued on Apr. 25, 1989, to William M. Stevens, discloses a portable automobile light, with a special adapter so that a fuse in the automobile fuse box may be removed, then the fuse is plugged into a special fuse holder with lead wires terminating in a spade type connector that will plug into the fuse box, with a third wire leading to one side of the spade type connector, and thence to a charging unit. The special fuse holder then plugs back to put the original fuse in its circuit. The instant invention is distinguishable, in that it diverts power from a car radio to power a cell phone.

U.S. Pat. No. 4,884,050, issued on Nov. 28, 1989, to Emmett L. Kozel, discloses a blade terminal tap fuse, by which power may be drawn from an automobile's fuse box to power a telephone, radio, or other electrical device. The instant invention is distinguishable, in that it allows existing fuses to be installed at a different location, rather than substituting tap fuses.

U.S. Pat. No. 5,125,855, issued on Jun. 30, 1992, to Dennis L. Brooks, discloses a vehicle fuse block extension, which plugs into a fuse block to extend contacts a short distance in one direction. The instant invention is distinguishable, in that it requires fuses to be removed to a new location, and allows more distant contacts in different directions.

U.S. Pat. No. 5,324,214, issued on Jun. 28, 1994, to Andre A. De Castro, discloses a blade type fuse block terminal adapter, by which an auxiliary device may be powered from an automobile fuse box. The instant invention is distinguishable, in that it provides an alternative fuse holder remote from the fuse box.

U.S. Pat. No. 5,431,585, issued on Jul. 11, 1995, to Eagle Fan, discloses a car circuit adapter, using a car cigarette lighter. The instant invention is distinguishable, in that it does require power from a cigarette lighter.

U.S. Pat. No. 5,444,428, issued on Aug. 22, 1995, to Francis L. Carr and George P. Canell, discloses a fuseholder for receiving portions of a pair of in-line electrical conductors which may be connected to a nonfused electrical adapter plug. The instant invention is distinguishable, in providing a new location for a fuse, and leads to an electrical device.

U.S. Pat. No. 5,476,396, issued on Dec. 19, 1995, to Andre A. De Castro, discloses an automobile blade type fuse block terminal adapter, which is a different version of the invention in U.S. Pat. No. 5,324,214 to same inventor, discussed above.

Japanese Pat. No. 11-260237, published on Sep. 24, 1999, invented by Kazuo Miyajima and Wataru Suehiro, discloses a fuse extracting jig for a multi-fuse and adapter.

None of the above inventions and patents, taken either singly or in combination, is seen to describe the instant invention as claimed.

SUMMARY OF THE INVENTION

The present invention is a switching apparatus and method designed to control a car radio or other device with only one connection to the vehicle and with no modification to the original wiring. (However, the scope of the invention is not limited to vehicles.) In the first preferred embodiment it is used to power a cell phone or other device from the line to the car radio. In either the first or second preferred embodiment, the power to the radio is cut off when the cell phone is in use. The fuse in the fuse box for the car radio is replaced with a dummy fuse. That fuse is then inserted into an in-line fuse holder, which offers the same protection as the original configuration. A connector on each leg of the output from the dummy fuse can supply power to the cell phone. Two connectors are used to assure that power will be supplied to a connector, because only one may have voltage due to the open dummy fuse. A third connector may be plugged, into one of the other connectors for powering of hand free cellular phones that may be independently fused. Leads coming from the invention may be connected to a relay or other switching device to turn on or off a car audio system or other device that might require this type of switching.

Accordingly, it is a principal object of the invention to provide a means for automatically turning off a car radio when a cell phone is in use.

It is another object of the invention to provide a means for diverting power from a car radio to a cell phone.

It is a further object of the invention to provide a means for automatically turning off any first device when any second device is in use.

Still another object of the invention is to provide a means for diverting power from any first device to any second device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an electrical switching apparatus and method, designed for motor vehicles, but which may also be useful in other settings.

Figure 1:
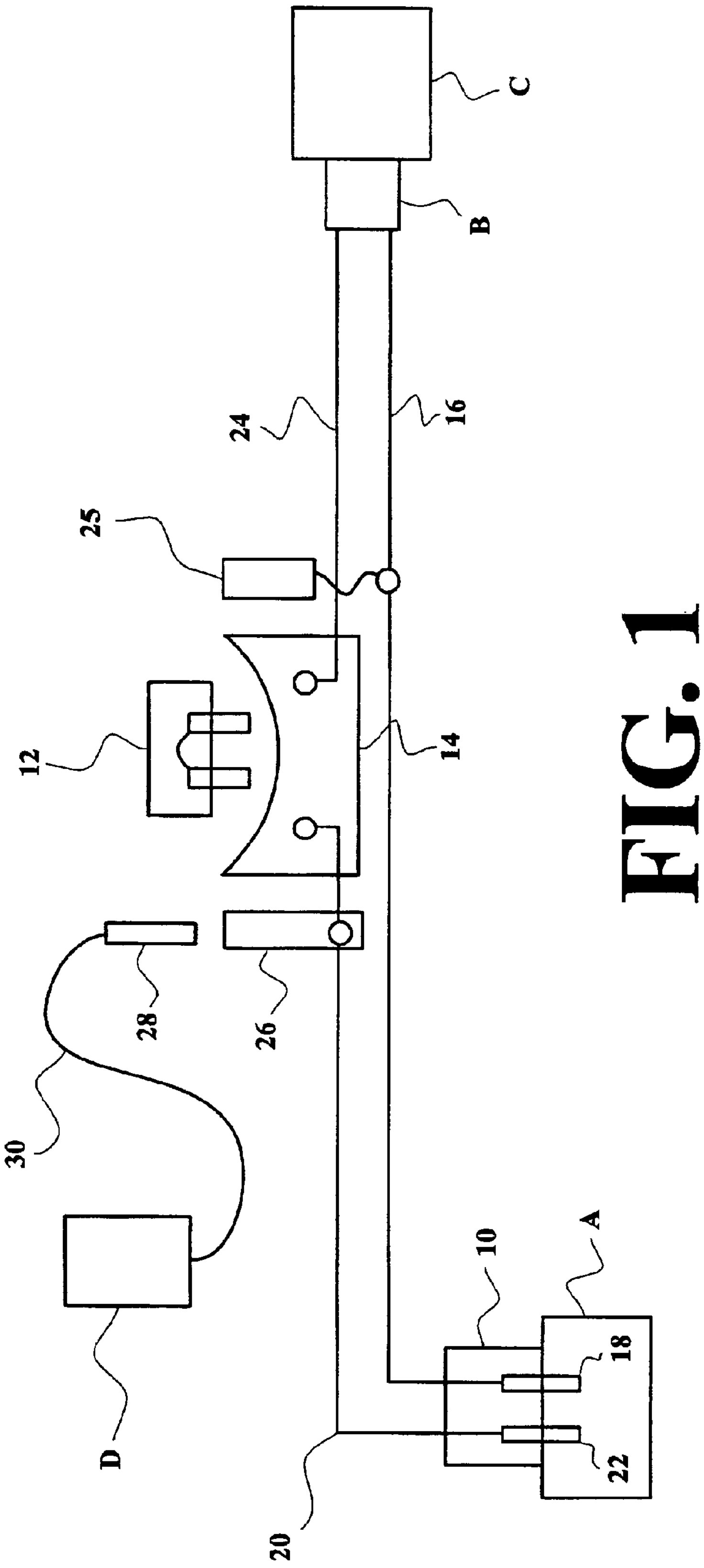
FIG. 1 is a schematic view of the first preferred embodiment of the invention.

FIG. 1 is a schematic view of the first preferred embodiment of the invention, showing a dummy replacement for a fuse ("dummy fuse") 10 in a fuse box A, a fuse 12, a fuse holder 14, a switching device B that turns the power on and off to a first electrically powered device C (e.g., a car radio), a first line 16 between the switching device B and the first prong 18 of the dummy fuse, a second line 20 between the second prong 22 of the dummy fuse and the fuse holder, and a third line 24 between the fuse holder and the switching device. Note that there is no electrical connection between the first and second prongs of the dummy fuse, so that the effect of the dummy fuse is the same as that of having no fuse in the fuse box. A first plug 25 is connected to the first line, and a second plug 26 is connected to the second line. A third plug 28 is connected to a fourth line 30 which is connected to a second electrically powered device D (e.g., a cellular telephone). (The lines may be metal wires or any other suitable electrical connections.) The third plug may matingly engage either the first plug or the second plug. If the first and second plugs are female, then the third plug should be male, and visa versa. Allowing the third plug to engage either the first or second plug assures the supply of power to the second electrically powered device, because only one of the first and second lines may have voltage due to the lack of an electrical connection through the dummy fuse.

The switching device B is remotely controlled by the second electrically powered device D. Thus, when D is turned on, it sends a signal to B that turns C off, and when D is turned off, it sends a signal to B that turns C on. The signal may be transmitted by electromagnetic radiation, ultrasonic sound waves, or any other suitable wireless means of transmission.

Figure 2:
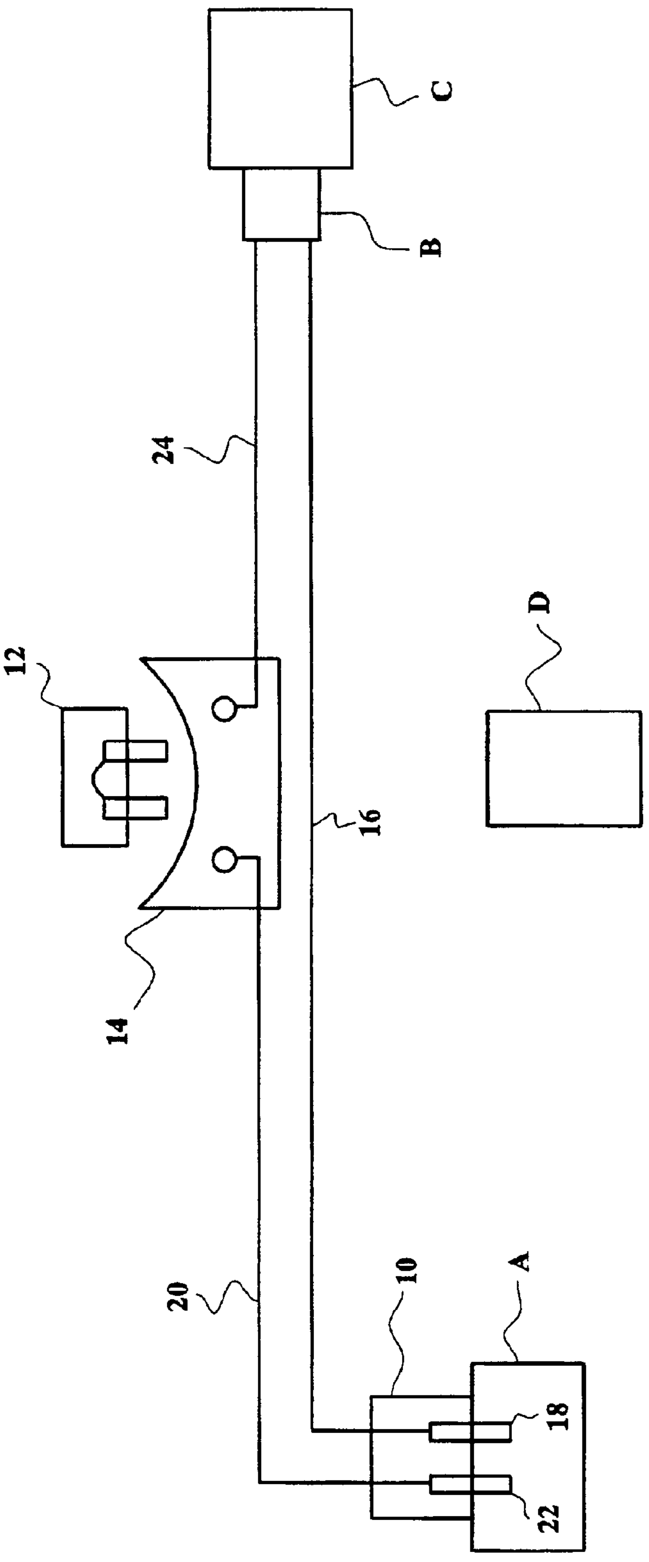
FIG. 2 is a schematic view of the second preferred embodiment of the invention.

FIG. 2 is a schematic view of the second preferred embodiment of the invention, which differs from the first preferred embodiment in that there is no first, second or third plug, nor is there a fourth line, and thus no power is diverted from the first device C to the second device D. But as in the first embodiment, a signal from D turns C on and off by remote control.

The invention includes both the above-described apparatus and methods of using the apparatus comprising the steps of:

1. Removing a fuse from the fuse box.
2. Replacing the fuse with the dummy fuse.
3. Placing the fuse from the fuse box in the fuse holder.

For the apparatus of the first preferred embodiment, there are the additional steps of:

4. Engaging the third plug with either the first or second plug.
5. Turning the second electrically powered device on, thereby causing a signal to be sent that cuts off power by remote control to the first electrically powered device and diverts the power to the second device, and/or turning the second device off, thereby causing a signal to be sent that turns on power by remote control to the first device and stops the diversion of power to the second device.

For the apparatus of the second preferred embodiment, there is the additional step of:

4. Turning the second electrically powered device on, thereby causing a signal to be sent that cuts off power by remote control to the first electrically powered device, and/or turning the second device off, thereby causing a signal to be sent that turns on power by remote control to the first device.

It is to be understood that the present invention is not limited to the embodiments described above, but encompasses any and all embodiments within the scope of the following claims.

I claim:

1. A switching apparatus, comprising:

a switching device;

a first electrical connector, that is connected to the switching device;

a dummy replacement for a fuse, that is connected to the first electrical connector;

a second electrical connector, that is connected to the dummy replacement for a fuse, with no electrical connection through the dummy replacement between the first electrical connector and the second electrical connector;

a fuse holder, that is connected to the second electrical connector; and a third electrical connector, that is connected to the switching device.

2. The switching apparatus according to claim 1, including:

a first plug connected to the first electrical connector.

3. The switching apparatus according to claim 2, including:

a second plug connected to the second electrical connector.

4. The switching apparatus according to claim 3, including:

a third plug that can engage a plug selected from the group comprising the first plug and the second plug; and a fourth electrical connector, that is connected to the third plug, and can supply power to an electrically powered device.

5. The switching apparatus according to claim 4, wherein the first plug and the second plug are female plugs, and the third plug is a male plug.

6. The switching apparatus according to claim 5, wherein the first plug, the second plug, and the third plug are spade type plugs.

7. The switching apparatus according to claim 6, wherein:

the first electrical connector, the second electrical connector, the third electrical connector, and the fourth electrical connector are metal wires.

8. The switching apparatus according to claim 4, wherein the first plug and the second plug are male plugs, and the third plug is a female plug.

9. The switching apparatus according to claim 8, wherein the first plug, the second plug, and the third plug are spade type plugs.

10. The switching apparatus according to claim 9, wherein:

the first electrical connector, the second electrical connector, the third electrical connector, and the fourth electrical connector are metal wires.

11. The switching apparatus according to claim 4, wherein:

the switching device controls a radio; and the electrically powered device is a cellular telephone.

12. The switching apparatus according to claim 1, including:

a first plug connected to the first electrical connector; and a second plug that can engage the first plug; and a fourth electrical connector, that is connected to the second plug, and can supply power to an electrically powered device.

13. The switching apparatus according to claim 1, including:

a first plug connected to the second electrical connector; and a second plug that can engage the first plug; and a fourth electrical connector, that is connected to the second plug, and can supply power to an electrically powered device.

14. A switching apparatus, comprising:

a switch for an electrically powered device;

a remote control that can turn the switch on and off;

a first electrical connector;

a dummy replacement for a fuse, that is connected to the first electrical connector;

a second electrical connector, that is connected to the dummy replacement for a fuse, with no electrical connection through the dummy replacement between the first electrical connector and the second electrical connector;

a fuse holder, that is connected to the second electrical connector; and a third electrical connector, that is connected to the switching device.

15. The switching apparatus according to claim 14, wherein:

the electrically powered device is a radio; and the remote control is connected to a cellular telephone.

16. A switching method, comprising the steps of:

removing a fuse from a fuse box;

replacing the fuse with a dummy fuse having a first electrical connection to a switch and a second electrical connection to a fuse holder, with a third electrical connection between the fuse holder and the switch; and placing the fuse in the fuse holder.

17. The switching method according to claim 16, wherein:

there is a first plug connected to the switch and the dummy fuse, a second plug connected to the dummy fuse and the fuse holder, and a third plug connected to an electrically powered device; and including the step of engaging the third plug with a plug selected from the group comprising the first plug and the second plug.

18. The switching method according to claim 17, wherein:

the switch controls a radio;

the electrically powered device is a cellular telephone; and the method is used in a vehicle.

19. The switching method according to claim 18, wherein:

there is a remote control that can turn the switch on and off.

20. The switching method according to claim 19, wherein:

the switch controls a radio;

the remote control is connected to a cellular telephone; and the method is used in a vehicle.

* * * * *